United States Patent [19]

Giebeler et al.

[11] Patent Number: 4,700,117
[45] Date of Patent: Oct. 13, 1987

[54] CENTRIFUGE OVERSPEED PROTECTION AND IMBALANCE DETECTION SYSTEM

[75] Inventors: Robert H. Giebeler, Cupertino; Christopher W. Parkes, Montara, both of Calif.

[73] Assignee: Beckman Instruments, Inc., Fullerton, Calif.

[21] Appl. No.: 740,086

[22] Filed: May 31, 1985

[51] Int. Cl.$^4$ ............................................. H02P 5/28
[52] U.S. Cl. .................................... 318/327; 340/671; 494/7; 494/10; 73/457; 318/811
[58] Field of Search ...................... 318/313, 327, 811; 73/462, 460, 457; 494/1, 7, 9, 10, 82, 84; 340/671

[56] References Cited

U.S. PATENT DOCUMENTS

| | | | |
|---|---|---|---|
| 3,746,247 | 7/1973 | Camilliere | 318/313 |
| 3,982,162 | 9/1976 | Olliffe | 318/327 |
| 4,419,615 | 12/1963 | Muto et al. | 318/811 |
| 4,491,019 | 1/1985 | Wicki et al. | 494/7 |
| 4,551,715 | 11/1985 | Durbin | 340/671 |
| 4,601,696 | 7/1986 | Kamm | 494/10 |

OTHER PUBLICATIONS

Sen et al, "Induction Motor Drives with Microcomputer Control System", Conference-IAS Annual Meeting, 1980, Cincinnati, OH, (28-Sep.-3 Oct. 1980).
Dewan et al.; "Slip Speed in an Induction Motor Drive with a Phase Locked Loop", Conference: Industry Applications Society-IEEE-IAS Annual Meeting, Cleveland, OH., (30 Sep.-4 Oct. 1979).
Moffat, et al., Digital Phase-Locked Loop for Induction Speed Control", IEEE Transactions on Industry Applications, vol. IA-15, No. 2, Mar./ Apr. 1979, pp. 176-182.
Sen et al., "Micro Processor Control of an Induction Motor with Flux Regulation", Conference: Industry Applications Society IEE-IAS Meeting, (1-5 Oct. 1978), pp. 664-668.

Primary Examiner—David Smith, Jr.
Attorney, Agent, or Firm—W. H. May; P. R. Harder

[57] ABSTRACT

A centrifuge overspeed protection and imbalance detection system is structured to provide a method for detecting rotor imbalance and rotor overspeed. The system has a single transducer to provide real-time data necessary to detect rotor imbalance and control motor speed.

Motor speed is controlled by synthesis of a drive frequency signal for driving the inverter motor control. The drive frequency signal may be inhibited to provide slow acceleration or deceleration, or to shut the motor off by providing a zero slip frequency. Motor control is responsive to a Rotor Identification circuit and operator programming, as well as a closed loop response to the real time tach signal.

Imbalance detection is provided by counting tach pulses in each of a plurality of intervals, detecting deviations in tach pulse rate and sounding an alarm when the irregularity of tach pulse signals exceeds the limits of a predetermined standard deviation.

8 Claims, 5 Drawing Figures

CENTRIFUGE OVERSPEED PROTECTION AND IMBALANCE DETECTION SYSTEM

FIELD OF THE INVENTION

This invention relates to an automatic control system for regulating the operation of a centrifuge and, in particular, to a system for providing centrifuge overspeed protection and imbalance detection and a method for the system's implementation.

BACKGROUND OF THE INVENTION

Centrifuge operation presents a unique set of design criteria where precision control of the rotational operation of the centrifuge is required. The wide variety of biological and chemical experimental research which use centrifugation as their primary tool to achieve component separation and perform experimental assays places a requirement of versatility on the operational characteristics which must be built into the centrifuge.

The centrifuge rotor is driven to extremely high rotational speeds in order to generate the centrifugal field required for biological research use. The high rotational speeds of the rotor cause a severe build-up of kinetic energy, which if released, can lead to destructive explosion of the centrifuge and injury or damage to its surrounding environment as well as the human operator. Centrifuge rotors typically can fail if the rotor is run in excess of the speed designed for its safe operation. The slightest imbalance of the rotor or load which it carries can cause catastrophic failure.

The centrifuge apparatus has numerous rotors which may be interchangeably used in conjunction with the same centrifuge motor and drive shaft in order that a diversity of biological experimentation may be achieved. One standard of centrifuge design encompasses an induction motor and shaft which can accommodate the interchangeable rotors to be carried on the spindle of the motor shaft, each rotor having a different weight and strength of material and a different maximum safe speed above which the particular rotor should not be operated.

Also, even the slightest imbalance of the rotor or load which it carries may grow to larger imbalances and associated forces as the rotor speed and centrifugal field increases. Often, these imbalances do not arise until the rotor has achieved very high speeds. Strain and stress within the material of the rotor exhibiting a slight fracture at rest can cause the rotor to dismember at maximum speeds approaching 100,000 revolutions per minute. The dynamic effect of any imbalancing forces cause complicated movement of the shaft upon which the rotor is suspended, such as dangerous whirls and gyrations.

It is therefore clear that a versatile centrifugation system requires: (1) a maximum safe rotor speed be identified for each rotor; (2) the operational use and control of the rotor during centrifugation be monitored and controlled; and, (3) that any imbalance be detected. If possible, the use of a single sensor and transducer system would provide accuracy and asynchronous information which may be used to control the motor speed for all varieties of rotors.

One such system is disclosed in U.S. patent application Ser. No. 605,365 filed Apr. 30, 1984 by Dennis Durbin and assigned to Beckman Instruments, Inc., the assignee of this application (now U.S. Pat. No. 4,551,715). That application entitled "Tachometer and Rotor Identification Apparatus for Centrifuges" is hereby incorporated by reference. In the disclosed specification, a method of rotor identification for each rotor and determination of the rotor's maximum safe speed is presented which relies on a single magnetically sensitive transducer to provide the necessary rotor identification and maximum safe speed information in a straightforward and precise manner.

The disclosure of U.S. Pat. No. 4,551,715 describes an improved signal processing circuit which allowed a tachometer signal and rotor identification signal to be generated from a single set of coding elements on the rotor. The Durbin application uses a circular array of magnetic coding elements on the rotor to provide the tachometer and rotor identification information. A Hall effect sensor is used to detect the magnetic orientation of permanent magnets imbedded in the base of each interchangeable rotor. In the preferred embodiment of Durbin, six magnets spaced at equal intervals around the circumference of the rotor are positioned to direct a north-oriented or south-oriented magnetic field outward from the base of the rotor for detection by the Hall effect sensor. The Hall effect sensor detects a change in magnetic reluctance as the permanent magnet rotates past the fixed sensor and induces a voltage in the sensor. A series of sharply defined pulses are generated in the conduction pathway and amplified in the Durbin system. Thus the Durbin disclosure presents an embodiment which is able to identify a rotor on the basis of a single transducer according to the combination and order in which north- and south-oriented magnets pass the Hall effect rotor. These same north and south pulses also produced a tach signal from which rotor speed can be identified. A central processing unit is used to compare rotor speed with rotor identification. Stored in the central processing unit is an information listing identifying the maximum rated speed for each individual rotor. Once the rotor is identified on the basis of a coded pulse train generated by the north- and south-oriented magnets imbedded within the rotor, the central processing unit reads the maximum rating information stored within its memory and compared these readings with the actual speed. The central processing unit also is aware of what had been programmed at the human operator keyboard for the desired acceleration and speed. The central processing unit functions to prevent the rotor from being programmed or actually operated beyond its intended rating. The magnetic transducer detection system represented a significant improvement over optical sensing systems which were subject to interference from dirt and damage, as well as inadvertent customer abuse when the wrong optical rotor disc was affixed to a rotor rated for a lower speed.

Conventionally, motor control has been achieved in centrifuges by controlling current or power to the induction motor which drives the rotor and shaft. Such current control may be disconnected or otherwise not be communicating with the centrifuge current bus. U.S. Pat. No. 4,286,203 to Ehret issuing Aug. 25, 1981 to Beckman Instruments, Inc., the common assignee with this application, discloses a *Slip Frequency Control System for Variable Speed Induction Motors.* This patented system controls rotor speed by maintaining a constant slip frequency regardless of motor speed. It is generally directed at normal operating conditions and drives the motor in response to an initial fixed frequency produced by relaxation oscillator 20. The system disclosed in the patent is not designed to respond to abnormal conditions such as rotor overspeed or imbalance.

What is clearly needed to insure centrifuge safety and sample integrity is a method of controlling the speed of the induction motor of a centrifuge through use of the information derived from the tach signal pulse train.

Additionally, it would be useful if imbalance detection could be effectuated to prevent imbalances which occur at high speeds from causing great destruction. The conventional art of centrifugation provides an electromechanical imbalance detector in the form of a microswitch which sits in proximity to the rotor shaft in order to detect whirling gyrations which may occur in the rotor shaft. The rotor shaft is fitted with a radially extending nub. A spring-mounted microswitch adjacent to the nub of the spindle shaft makes contact if the shaft wobbles excessively. This causes the capacitor to be discharged and triggers a digital signal at the output of a monostable multivibrator providing an active low pulse to the microprocessor. This detection system has worked fine at speeds below 30,000 r.p.m., but unfortunately is not sufficiently responsive to detect imbalance during high speed rotation.

What is clearly needed is a sensor detection system which not only identifies individual rotors and their maximum safe speeds, but also controls their speed, monitors their speed, and detects rotor imbalance.

SUMMARY OF THE INVENTION

The present invention is a method and system for controlling and monitoring the speed of a centrifuge which rotates at ultrahigh speeds. Additionally, the method and system disclosed provides for the detection of rotor imbalance and a means for sounding an alarm when the rotor speed or imbalance exceed predetermined value ranges.

In particular, a system for controlling and monitoring the rotational speed of a centrifuge rotor is disclosed. An electronic sensor detects the actual speed of the rotor asynchronously and on a real-time basis by driving a tach signal pulse train and providing this pulse train to the input of a phased lock loop frequency adder for combination with a computer derived slip frequency. During certain perdetermined ranges, the frequency adder adds the slip frequency to the tach signal and derives a drive frequency which is sent to the Johnson counter of an inverter. The inverter in turn produces a three phase control signal for controlling the induction motor which drives the high speed centrifuge rotor. This closed loop system involves the creation of a slip frequency by converting the tach signal to a computer readable digital format. Operator keyboard program and rotor identification circuit information are analyzed within the microprocessor of the central processing unit along with the converted tach signal information. These informational inputs to the central processing unit are combined to derive a slip frequency. The slip frequency is determined by passing a pulse train through a frequency synthesizer which produces a frequency at the desired slip rate in accordance with known formulations to maintain an optimal percentage of slip and yet accommodate operator keyboard program and Rotor Identification input. The slip frequency thus derived when added to the tach signal produces a drive frequency which controls the inverter and the induction motor.

During those periods in the rotor acceleration cycle where it is not desirable to add the tach signal to a slip frequency, but simply generate a control signal directly from the computer, an override control signal is imparted to the inverter to overtake and control the timing of the motor. This signal occurs generally during initial acceleration and final deceleration, as well as those circumstances where other safety problems are detected in the system, such as temperature exceeding predetermined limitations during rotor operation or rotor imbalance.

A system for detecting rotor imbalance includes obtaining the tach signal pulse train derived from a sensor input and converting that signal to a CPU readable format. Various intervals of signals are counted to determine frequency and frequency deviations. If from one interval to another, tach signal frequency deviates substantially, a rotor imbalance is detected. Such irregular signals are an indiciation that the rotor has tilted away from the sensor, causing the Hall sensor to not detect all six magnets per revolution. In this manner, imbalance may be detected and an alarm override signal may be sent to the inverter to shut the motor down.

The invention also comprises a method for detecting high speed rotor imbalance and controlling and monitoring rotor speed. This method includes deriving a tach signal pulse train that corresponds to actual rotor speed; converting the signal derived for analysis by a central processing means; comparing the actual signal with operator programmed acceleration instructions as well as information concerning the upper limits of acceleration from the Rotor Identification circuit; deriving from those sources of input a slip frequency which, when added to the actual tach signal rotor frequency, produces a drive frequency for controlling the induction motor of the centrifuge motor. Additionally, a method is disclosed for detecting rotor imbalance by deriving a train of tach signal pulses; converting those pulses to a format intelligible to a central unit; determining the frequency of pulses received during a variety of intervals; comparing the frequency derived at one time interval with the frequency derived at another time interval (with the expected frequency due to uniform acceleration accounted for) and producing a deviation frequency which corresponds to the difference in frequencies between the impulse; comparing the deviation frequency derived with a preset reference to determine whether the frequency deviation exceeds safe limits; producing an override control signal to shut down the inverter and induction motor when preset limits are exceeded, thereby detecting rotor imbalance at high speeds.

DETAILED DESCRIPTION OF THE PREFERRED EMBODIMENT

Figure 1:
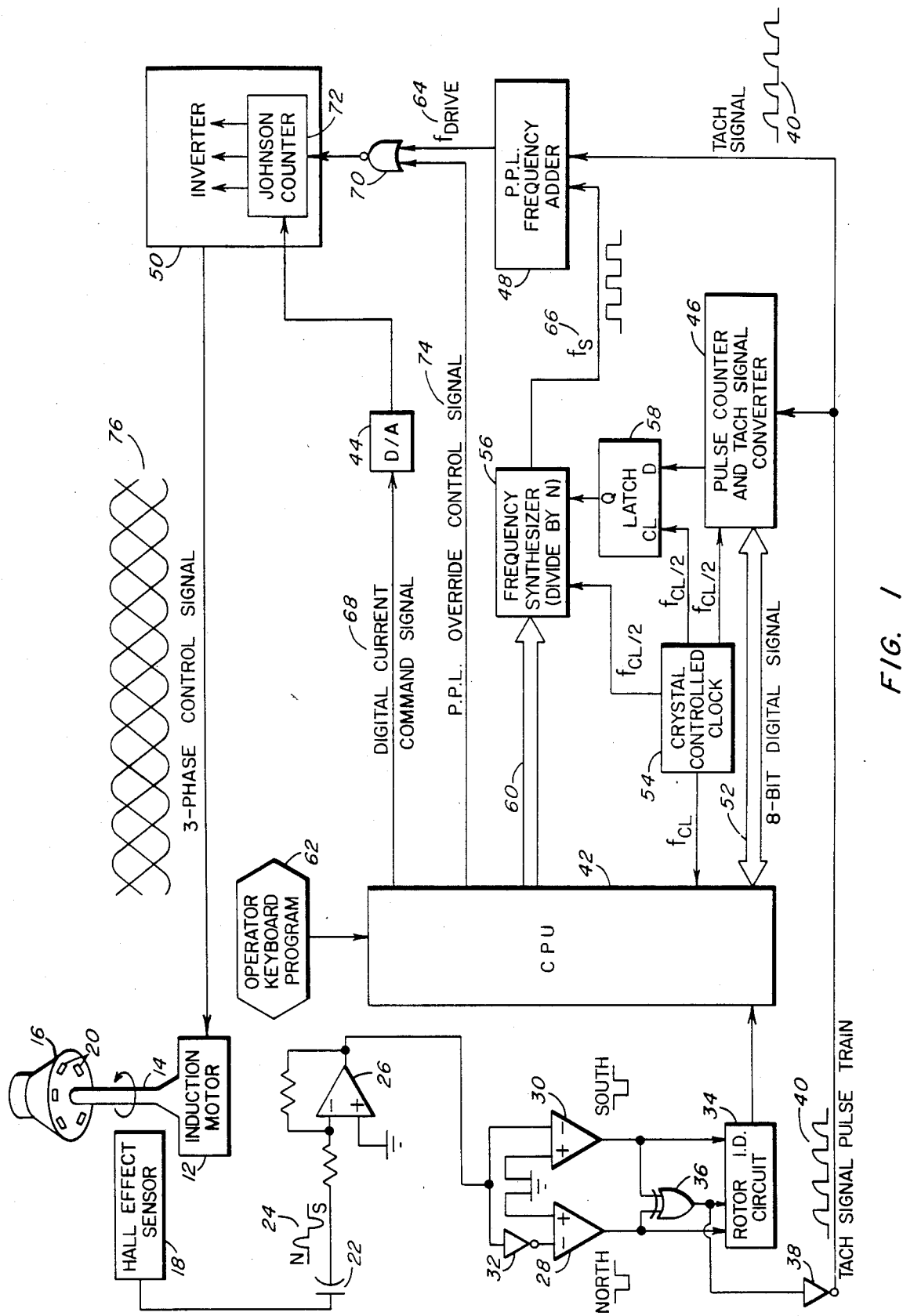
FIG. 1 is a schematic-block of a preferred embodiment of the centrifuge overspeed protection and imbalance detection system which is the subject matter of this invention.

With reference to FIG. 1, there is disclosed a system by which information provided by the tach signal pulse train may be utilized to control an induction motor and protect against overspeed and rotor imbalance.

Figure 2A:
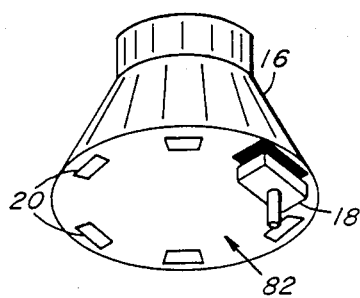
FIG. 2A is a perspective view of the rotor showing one of the six magnets physically positioned at the base of the rotor in relation to the Hall Effect detector.

The induction motor 12 has a spindle shaft 14 upon which an individually selected rotor 16 may be affixed. The underside plan view of the rotor 16 is represented by a flat circular surface having a plurality of magnets 20 imbedded therein. When driven by the induction motor 12, the rotor 16 revolves past the Hall effect sensor 18. The sensor 18 is able to detect changes in magnetic reluctance occurring when permanent magnets 20 pass the transducer surface of the Hall effect sensor 18. FIG. 2A shows the flat circular base surface 82 of the rotor 16. The permanent magnets 20 are embedded in the rotor base 82 and rotate past the Hall Effect sensor 18 as the rotor 16 turns about its own axis.

The output tach pulse from the Hall effect sensor 18 (FIG. 1) is conveyed through capacitor 22 in order to filter out unwanted D.C. noise, resulting in a waveform as shown at 24. As is apparent, waveform 24 comprises positive-going pulses representative of north-oriented magnets as well as negative-going pulses representative of south magnets 20. This signal is then amplified by amplifier 26. The output of amplifier 26 is operatively fed to the inverting input of two separate operational amplifiers 28 and 30. The north signal first passes through inverter 32 so that the output at both operational amplifiers 28 and 30 will be signals of the same negative transition. South and north signals are distinguished by the Rotor Identification (I.D.) circuit 34 since within the Rotor Identification circuit 34 north and south pulses are counted separately. Additionally, the output signals from operational amplifiers 28 and 30 are coupled to the input terminals of exclusive OR gate 36. Exclusive OR gate 36 triggers a pulse each time a north or a south signal is developed at either of its input terminals. The counters within Rotor Identification circuit 34 are triggered by the leading edge of the negative pulse produced at the output of exclusive OR gate 36. The output of exclusive OR gate 36 is tapped and the output pulse signal derived is coupled through the inverter gate 38, in order to produce the tach signal pulse train 40 as shown. This pulse train is the same pulse train produced and disclosed in the Durbin Patent.

A unique feature of this invention is the use of the pulse train shown at 40 to provide overspeed protection and high speed imbalance information to the central processing unit (CPU) 42. In the conventional art, the central processing unit 42 controls the operation of the induction motor 12 by directly controlling the power inverter 50. Conventionally, the central processing unit 42 generated a digital current command signal 68 which, when processed through a digital-to-analog converter 44, produced an analog voltage which is capable of driving the power inverter 50 through Johnson counter 72. Current control may be used to control the operation of the induction motor 12 by cascading the voltage upward during acceleration and downward during deceleration while constantly maintaining the current at a level sufficient to overcome the counter e.m.f. of the induction motor 12, driving the motor 12 up to an optimal and efficient operational mode. This form of conventional current control of induction motor 12 has a disadvantage when it is the sole means of control. The current control line can be disrupted causing the current to rise. Loss of current control will result in driving the rotor to destructive speeds or in the overheating and destruction of the induction motor. Even if the rotor identification circuit 34 communicates to the CPU 42 that the rotor is rated below the speed that the current bus drives it, a severing of the current control system may result in a rotor being driven overspeed and substantially damaging the centrifugation chamber. One reason this may occur is the fact that the digital current command signal system is designed to monitor actual current fed to the inverter 50 by means of an optical sensing system (not shown) which optically isolates the bus power supply from the digital current command signal. However, if for example the current feedback phototransistor (which reads the "LED" of the current bus) breaks down, the computer may continue to drive the digital current command signal upward in the absence of the actual current feedback, resulting in possible rotor destruction or induction motor 12 burnout.

The conventional art has heretofore taught the generation by the central processing unit of a fixed frequency reference which will serve as the basis of a synthesized frequency control system. Such a fixed frequency signal may not accurately reflect operating conditions. A single fixed frequency signal, even when synthesized by the central processing unit, may lack the real time flexibility required to adapt the system to the wide range of interchangeable rotors which may be used by the human operator.

The invention provides a frequency drive signal controlling of the induction motor by means of a closed loop system which asynchronously monitors the actual tach signal and adjusts the control signal accordingly.

An improved motor control system by using a drive frequency control signal is provided in the preferred embodiment by simultaneously inputting the tach signal pulse train 40 into a pulse counter and tach signal converter 46 and a phase locked loop frequency adder 48. The frequency drive signal control system generally provides real time tach signal information to the central processing unit 42 which uses this information, as well as other information, to produce a drive frequency control signal. The tach signal pulse train 40 is imparted to the pulse counter and tach signal converter 46, which in the preferred embodiment is a programmable counter programmed to operate as a "Divide-by-N" counter. The pulse counter 46 may be a programmable interval timer manufactured by Intel Corporation of Santa Clara, California as Model 8253. Bidirectional bus 52 provides a pathway for the pulse counter 46 to inform the central processing unit 42 as to the number of pulses counted during the pre-programmed time interval (N). Essentially, the pulse counter 46 converts the tach signals pulse train into at least tow eight-bit digital words which the central processing unit 42 can store in its memory and use as a basis for further instructions. A crystal controlled clock 54 provides an extremely stable six megahertz frequency signal to the central processing unit and a timing signal of three megahertz (or approximately one half that provided to the central processing unit 42) to the pulse counter 46, the frequency synthesizer 56, and the latch circuit 58. Tach signals provided to the pulse counter 46 are additionally coupled to the flip-flop latch 58 for output to the frequency synthesizer 56 according to clock signal produced by the crystal controlled clock 54. Thus, tach signal rotor speed information is provided to the central processing unit 42 by the pulse counter 46 in the form of an eight-bit digital words. The tach signal 40 is also provided to the frequency synthesizer 56 as a conditioned signal through the latch 58 by way of the counter 46. The pulse train is coupled to the synthesizer 56 in synchronization with the central processing unit 42 by the crystal controlled clock 54. The central processing unit 42 may subsequently send instructions along unidirectional bus 60 to the frequency synthesizer 56 to produce a slip frequency ($f_s$) which is coupled to the frequency adder 48, a phase locked loop integrated circuit in the preferred embodiment. The frequency adder may be the CD4046A COS/MOS Integrated Circuit manufactured by RCA Solid State Division, RCA Corporation, Somerville, N.J. 08876. The frequency synthesizer 56 produces an output frequency, $f_s$, which is equal to the frequency received from latch 58 divided by the "N" number provided by CPU 42. The frequency synthesizer 56 may be a "Divide-by-N" counter sold by Intel Corporation as a Model 8253 Programmable Interval Timer.

Induction motors require that there be some slip or difference between the drive speed provided by the inverter 50 and the actual speed which the rotor is able to run. (Actual speed is detected by this system as the tach signal pulse train 40.). For example, if an optimum operation of the induction motor 12 require that at a 10,000 revolutions per minute (RPM) drive speed, the induction motor actually operates at 9800 revolutions per minute, then a slip frequency of 200 R.P.M. might be necessary to provide the torque to keep the induction motor running. As speed is increased, the percentage of slip must be maintained and the slip frequency must be increased. For smooth motor operation, slip frequency should be kept at a relatively constant percentage of the drive control frequency driving the induction motor. Thus, the ideal drive frequency is one which is increased by adding the actual tach signal frequency, derived from a tach signal pulse train such as 40 and adding that signal to a slip frequency ($f_s$) 66 computed to maintain a fixed percentage but driving the induction motor 12 at a faster speed.

As a further example, assume that the human operator, by use of the operator keyboard program 62, has instructed the central processing unit 42 to accelerate the rotor in a linear fashion over the range of 1500 revolutions per minute up to 2,000 revolutions per minute. In order to carry out the operator program instructions, the central processing unit must sense the actual rotor speed which it receives in a digital form from pulse counter 46. Once the central processing unit is informed that a speed of 1500 revolutions per minute has been achieved, it then executes the operator program by instructing the frequency synthesizer 56 to increase the slip frequency ($f_s$) over a fixed period, so that the actual rotor frequency will increase from 1500 revolutions per minute to 2,000 revolutions per minute. If, for 1500 revolutions per minute, the computer central processing unit 42 was instructing the frequency synthesizer 56 to produce one pulse output for every three pulses input from latch 58 for a standard time interval, the new instruction would cause the frequency synthesizer 56 to produce one a pulse for every four pulses which are latched from flip-flop in the same standard time interval. The slip frequency would be increased 30% above the frequency needed to produce optimal slip at 1500 RPM, so that the new slip frequency produced to achieve 2000 RPM would represent a constant percentage of slip. In this manner the slip frequency may be changed to suit the pre-programmed requirements of the human operator.

In the preferred embodiment, the drive frequency control system operates to initially accelerate the rotor to 5,000 revolutions per minute by ramping up both the drive current and the drive frequency with time in accordance to the pre-programmed instructions of the human operator. The system analyzes the tach signal 40 to ascertain the regularity of pulse rate before the rotor is allowed to accelerate as programmed up to 5,000 revolutions per minute. Once the rotor reaches an actual tach signal frequency indicating 5,000 revolutions per minute, the drive frequency signal 64 which is derived from the output of the phase locked loop frequency adder 48 is the sum of the synthesized flip frequency 66 ($f_s$) and the tach signal pulse train 40. The slip frequency selected is pre-programmed in the operating system for optimum electrical motor efficiency for the particular instantaneous speed achieved. The slip frequency is not uniform over the range of 5,000 revolutions per minute up to 100,000 revolutions per minute; however, the percentage slip is maintained as a constant percentage of actual speed to achieve greatest motor efficiency. Control through operator keyboard program 62 is relinquished above the 5,000 revolutions per minute range. Additionally, the digital current command signal 68 varies motor current to maintain desired set speed. The phase locked loop frequency adder 48 is used to provide a stable frequency which represents the sum of the tach signal plus the slip frequency, to achieve optimum motor torque over the entire range of motor operation. The inverter 50 is driven by the Johnson counter 72 to produce a three-phase control signal 76 to control the induction motor 12 in a closed loop fashion.

During normal operation above 5,000 revolutions per minute, the drive frequency provided to the input of NOR gate 70 is imparted to Johnson counter 72 for driving the induction motor by generating a three-phase control signal 76. For speeds below 5,000 revolutions per minute, or during breaking deceleration, or in the event that an imbalance is detected or another alarm condition has been indicated to the central processing unit, the phase locked loop override control signal 74 triggers the output of NOR gate 70 to disable the drive frequency 64 and replace the drive frequency signal with a newly generated drive frequency for breaking or deceleration, or shutting down the system. For example, the phase locked loop (P.P.L.) override signal 74 may cut off a first drive frequency output ($f_{drive}$) from the frequency adder 48 and replace it with a frequency equal to the tach signal and a slip freqency of zero. When the tach signal equals the drive frequency, the induction motor will coast and the system can shut down, even if the digital current command signal is unable to block the current to the induction motor. The override drive frequency signal (74) will cause the induction motor to coast to a safe stop, whether or not digital current command signal 68 reaches the Johnson counter 72. This PPL override signal 74 provides a fail safe guard against loss of current command control.

As noted earlier, FIG. 2A shows a perspective view of the rotor with the under side turned towards the viewer to illustrate the rotor body 16, the flat circular base 82, and the magnets 20 imbedded equi-distant within the base 82. A Hall Effect sensor 18 is shown detecting the changes in magnetic flux and magnetic reluctance as the magnets 20 pass by the sensor 18. At speeds exceeding 30,000 R.P.M., in the event of rotor 16 imbalance, the sensor 18 will not detect the passage of all six magnets per revolution, and the output tach signal from sensor 18 will produce a tach signal 40 which deviates from expected frequency.

Figure 2B:
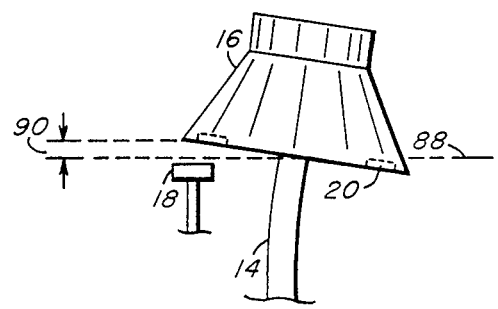
FIG. 2B is a side view of the rotor operational mounted on a shaft, where the rotor base is slightly off its proper orientation indicative of rotor imbalance.

FIG. 2B shows the condition of high-speed imbalance which may be present at speeds in excess of 30,000 revolutions per minute. The FIG. 2B is a pictoral representation of what is believed to be the imbalance phenomena. The rotor 16 is slightly tilted off its horizontal axis 88, so that its side nearest the Hall Effect detector 18 is turned away from the detector 18. A gap 90 is created between the detector 18 and the rotor 16 when the rotor 16 and shaft 14 are tilted due to the imbalance. The detector is unable to detect a change in magnetic reluctance due to the passage of magnets 20 over the detector 18, since a slight movement of the base 82 (FIG. 2A) away from the detector 18 will render the detector 18 insensitive to the change in magnetic reluctance which would otherwise be detected. Thus, for each revolution while rotor imbalance is present, the pulse train generated by the detector 18 as the rotor 16 revolves past the detector 18 is irregular and deviates from a reference pulse count stored in the CPU 42 of FIG. 1. (The reference pulse count is stored as a number in the CPU 42 and corresponds to the count expected when the rotor 16 is properly balanced.)

Figure 3:
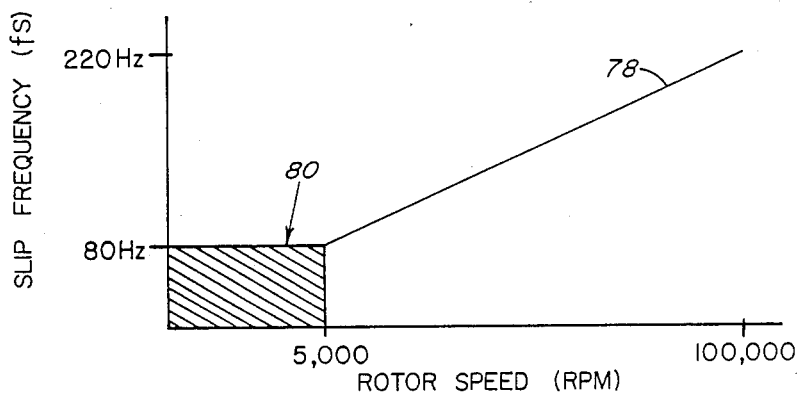
FIG. 3 is a graphic representation of the relationship between slip frequency and rotor speed during the centrifuge operating cycle of the invention; and, FIG. 4 is a graphic representation of rotor speed as a function of time during the centrifuge operating cycle in accordance with the invention.

FIG. 3 is a graphic representation of the operational cycle of a centrifuge rotor for the entire range from zero to 100,000 revolutions per minute. Up to a speed of 5,000 revolutions per minute, the rotor speed operation is not subject to the predictions of any mathematical equation. This initial area of operation is indicated in the shaded area on the graph in FIG. 3 at 80. Beginning at 5,000 revolutions per minute and up to 100,000 revolutions, there is a linear relationship between slip frequency and rotor speed as indicated by the graph along sector 78. Above a range of 5,000 revolutions per minute, operator keyboard program is overridden and the computer automatically programs the optimal slip frequency so that the rotor uniformly attains a speed of 100,000 revolutions per minute. As one will note, the linear slope of sector 78 is characteristic of a fixed percentage slip over the range of 5,000 revolutions per minute to 100,000 revolutions per minute, representative of a fixed percentage of rotor speed as the speed acceleration.

Figure 4:
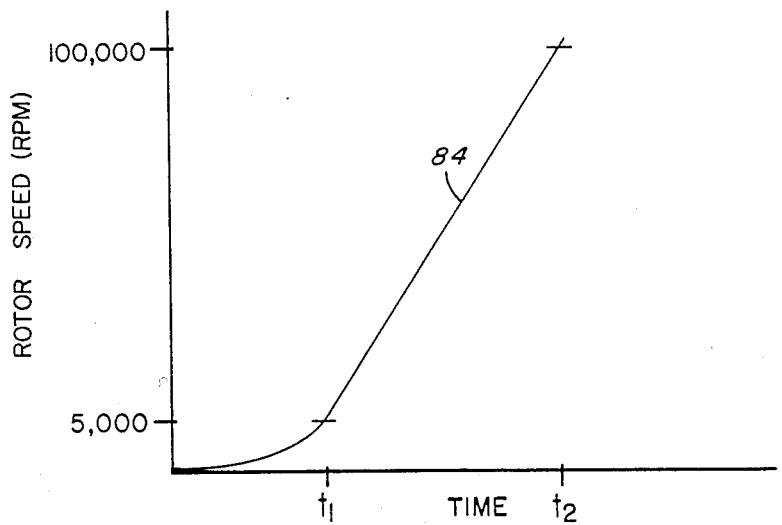

Referring to FIG. 4, the relationship between rotor speed and time is indicated. Up to 5,000 revolutions per minute, the acceleration is gradual and nonlinear. Beginning at 5,000 revolutions per minute up to 100,000 revolutions, a rapid uniform acceleration takes place between time intervals T1 and T2. The segment of linear acceleration is indicated by reference character 84 of FIG. 4.

The rotor imbalance detection system operates within the schematic structure of FIG. 1. A tach signal pulse train 40 is provided to the pulse counter the tach signal converter 46. The pulse counter 46 generates an eight-bit digital signal which is representative of the tach signal frequency at the time the tach signal 40 is sampled for a preset period of time, such as a one second sampling period. The central processing unit records the frequency of the tach signal pulse provided by the pulse counter 46 and stores this information within its memory registers (not shown). The tach signal pulse train is sampled at a number of different intervals. For example, ten one-second intervals may be sampled and each sampling conducted ten seconds apart. The central processing unit 42 analyzes the data which it receives from the pulse counter 46 and determines whether each or any of the samplings indicate a frequency deviation or differential. (The CPU 42 has been programmed to include the constant acceleration of the rotor 16 for purposes of imbalance detection.) If ten samples are taken, each of the samples may be analyzed to determine whether there is a frequency deviation. Once the frequency deviation has been determined, the central processing unit further analyzes the data to determine whether or not the deviation frequency so detected is a random occurrence or one which arises with great regularity. The more regular the deviation frequency, the more likely the central processing unit will determine that there is a centrifuge rotor imbalance. Deviation frequency is the difference between expected signal and actual (imbalance indicating) frequency. For example, the number of frequency deviations and the amount of deviations, from an average frequency over the full range of the tach signals sampled could be matched by the computer against a mathematical statistical standard deviation curve. If the frequency deviation is outside the predetermined range of standard statistical deviation (even after accounting for programmed constant accelerations) as defined by the mathematical function stored within the computer, an alarm is sounded. In this manner, rotor frequency imbalance may be detected. This is an accurate means of detecting rotor imbalance, since an irregular or off-timed pulse or series of pulses within the tach signal pulse train 40 indicates that as the magnets 20 revolve past the Hall Effect sensor 18, the base plane 82 (FIG. 2A) is slightly tilted so that one or more magnets 20 do not produce tach signals as the rotor revolves about its axis. It is the missing tach signals that create the frequency deviation that the central processing unit 42 detects. Irregular tach pulse train signals indicate the existence of rotor imbalance, since they deviate from the pulse train frequency expected if the rotor were in proper balance.

It should be noted that the preferred embodiment is merely illustrative of the centrifuge overspeed protection and imbalance detection system. The scope of the invention is not necessarily limited to the preferred embodiment. Many structural changes are possible and these changes are intended to be within the scope of this disclosure. For example, this system has many segments, such as the phase-locked loop and drive frequency inhibit gate which could be replaced by software commands and sub-routines within the CPU. Consequently, the specific structural and functional details of the system disclosed are merely representative; they are deemed to afford the best embodiment for purposes of disclosure and for providing support for the claims which define the scope of the present invention.

What is claimed is:

1. A method for high speed centrifuge rotor imbalance detection, the steps of which comprising:
   deriving a tach signal frequency which corresponds to the actual speed of a centrifuge rotor when said rotor is in balance and deviates therefrom when said rotor is out of balance;
   determining the tach frequency signal derived for a plurality of discrete intervals;
   calculating by means of a central processing unit any differences between the frequencies computed for each of the discrete intervals and deriving therefrom a deviation frequency signal;

measuring the deviation frequency signal derived against a predetermined standard, thereby detecting the presence of high speed rotor imbalance.

2. A system for the detection of high speed centrifuge rotor imbalance, comprising:

means for sensing true rotor speed when said rotor is in balance and generating a rotor tach signal having a frequency proportional thereto;

means for measuring the frequency of the rotor tach signal at a plurality of sampling intervals;

means for generating a dynamic reference frequency, said dynamic reference frequency being a reference frequency derived according to expected rotor operating conditions when the rotor is in proper balance;

said dynamic reference frequency changing with time as rotor speed and acceleration change;

comparing means for comparing the frequency of the rotor tach signal sampled at each of a plurality of intervals to the dynamic reference frequency and deriving a deviation frequency; and means for processing the deviation frequency and determining whether said deviation frequency exceeds a predetermined range, whereby centrifuge rotor imbalance is detected when said deviation frequency exceeds said predetermined range.

3. In determining irregularities in the operation of said centrifuge, the steps of which comprise:

deriving a tach signal during the operation of said centrifuge;

determining the frequency of said tach signal during a plurality of discrete intervals;

detecting any differences between any of the frequencies determined for each of the discrete intervals and an expected frequency;

and, comparing said detected difference against a known standard thereby detecting the existence of irregularity in the operation of said high speed centrifuge.

4. In a centrifuge a system for the detection of rotor imbalance comprising:

signal generating means for generating an electrical signal having a frequency indicative of acutal rotor speed when the centrifuge rotor is in balance and which deviates therefrom when said rotor is out of balance; and means signalling the deviation of said frequency from an expected value by a predetermined amount.

5. The system according to claim 4 for the further detection of rotor overspeed comprising:

means comparing said frequency of said electrical signal against a frequency indicative of the maximum safe speed for said rotor and generating a signal indicating that said rotor has exceeded said maximum rotor speed.

6. In a centrifuge a system for the detection of rotor imbalance comprising:

signal generating means for generating an electrical signal having a frequency indicative of actual rotor speed when the centrifuge rotor is in balance and which deviates therefrom when said rotor is out of balance;

means for generating a reference signal having a frequency derived according to expected conditions when said rotor is in proper balance;

comparison means for comparing the frequency of said electrical signal from said signal generrting means with the frequency of said reference signal; and deviation signal generating means for generating an output signal when the frequency of said electrical signal deviates from the frequency of said reference signal by a predetermined amount whereby centrifuge rotor imbalance is detected and signalled.

7. A system for the detection of centrifuge rotor overspeed and imbalance comprising:

signal generating means for generating an electrical signal having a characteristic indicative of acutal rotor speed when the centrifuge rotor is in balance and which deviates therefrom when said rotor is out of balance said electrical signal also having a characteristic identifying the particular rotor present;

means receiving said electrical signal and generating an output indicating the maximum speed for the identified rotor;

means for generating an output signal when said electrical signal indicates that the actual rotor speed has exceeded the maximum speed for said identified rotor;

means for measuring the speed indicating characteristic of said electrical signal at a plurality of sampling intervals;

means for generating a dynamic reference characteristic, said dynamic reference characteristic being a reference characteristic derived according to expected rotor operating conditions when said rotor is in proper balance, said dynamic reference characteristic changing with time as rotor speed and acceleration change;

comparing means for comparing the characteristic of said electrical signal sampled at each of a plurality of intervals to the dynamic reference characteristic and deriving a deviation characteristic; and means for processing the deviation characteristic and determining whether said deviation characteristic exceeds a predetermined range and generating an output signal when said range is exceeded whereby centrifuge rotor imbalance is detected.

8. The system according to claim 7 wherein said signal characteristic is frequency.

* * * * *